United States Patent [19]
Kellogg

[11] 4,046,232
[45] * Sept. 6, 1977

[54] DISC BRAKE SLIDING CALIPER ASSEMBLY WITH BRAKE PADS OF A COMMON PATTERN, AND METHOD OF CONSTRUCTION

[75] Inventor: George Edward Kellogg, Bougival, France

[73] Assignee: General Motors Corporation, Detroit, Mich.

[*] Notice: The portion of the term of this patent subsequent to Dec. 14, 1993, has been disclaimed.

[21] Appl. No.: 718,532

[22] Filed: Aug. 30, 1976

Related U.S. Application Data

[62] Division of Ser. No. 562,850, March 27, 1975, Pat. No. 3,997,034.

[30] Foreign Application Priority Data

Mar. 28, 1974 United Kingdom ............... 13743/74

[51] Int. Cl.² ............................................. F16D 69/04
[52] U.S. Cl. ................................... 188/73.1; 188/73.6
[58] Field of Search ..................... 188/72.4, 73.1, 73.3, 188/73.6, 250 B, 250 F, 250 G

[56] References Cited

U.S. PATENT DOCUMENTS 3,261,430  7/1966  Wilson et al. ....................... 188/73.6

FOREIGN PATENT DOCUMENTS 1,379,099  1/1975  United Kingdom ................ 188/73.1

Primary Examiner—Trygve M. Blix
Assistant Examiner—Edward R. Kazenske
Attorney, Agent, or Firm—D. D. McGraw

[57] ABSTRACT

A slidably mounted disc brake caliper assembly has a hydraulic actuator in one limb on one side of the disc to be braked. One brake pad is fixed against the other caliper limb. The brake pads have ears extending on either side of the caliper bridge joining the two limbs and bent out of the backing plate plane to provide sufficient clearance for such sliding movement. The brake pad which is fixed has its ear bent for installation and, when in place, the ears are straightened to clinch against the caliper bridge. The fixed brake pad is thus held against its associated caliper limb for brake applying force transmittal. Both brake pads are made from the same pattern and are identical prior to installation.

3 Claims, 5 Drawing Figures

DISC BRAKE SLIDING CALIPER ASSEMBLY WITH BRAKE PADS OF A COMMON PATTERN, AND METHOD OF CONSTRUCTION

This is a Division of U.S. Ser. No. 562,850, filed Mar. 27, 1975, now U.S. Pat. No. 3,997,034.

This invention relates to disc brake slidable caliper assemblies suitable for automotive vehicles, and a method of assembly.

Caliper assemblies are known in which the caliper is slidable on a fixed member extending radially-inwards alongside the disc and bolted or otherwise secured at its radially-inner end to a fixed part of the vehicle. In the case of a front brake, this part would be integral with the stub axle or steering knuckle. One brake pad is positioned on one side of the disc and arranged to be slidably movable relative to the caliper housing during brake actuation. A piston or other actuating mechanism provided in one caliper limb moves the brake pad. The caliper limb on the other side of the disc has another brake pad abutting it so that it is movable with the caliper body.

A disc brake caliper assembly according to the present invention comprises a rotary disc, a non-rotary carrier having a caliper mounted on pins for slidable movement along them on braking action and supporting two brake pads adjacent the respective sides of the disc, one pad being directly movable into contact with one face of the disc so as by reaction to effect sliding movement of the caliper to apply the other pad to the other face of the disc; the arrangement being such that the braking torque reaction is transmitted from the pads to the caliper and thence to the pins and the carrier.

The brake pads are made to a common pattern and each pad includes a backing plate and a lining segment. Each backing plate has ears arranged to rest on ledges provided at either side of the caliper body bridging section between the caliper limbs. The slidable brake pad has its ears bent out of the planes of its backing plate side surfaces to permit brake pad sliding movement on guide surfaces formed by the sides of the caliper bridging section. The ears of the other brake pad clinch tightly to the caliper body since the common brake pad pattern is such that the space between the ears of each backing plate when the ears are within the backing plate side surface planes, relative to the width of the caliper body between its guide surfaces, will not permit free sliding movement, but causes the ears to engage and clinch tightly to the caliper body. For ease of assembly, all brake pad ears are bent to provide sliding clearance and the ears of the other brake pad are straightened after positioning the brake pad against its caliper limb and on the ledges, thus clinching it to the caliper body. The other brake pad remains slidable, so its ears remain bent.

The appended claims define the scope of the claimed invention. How the invention can be performed is hereinafter particularly described with reference to the accompanying drawings, in which:

Figure 1:
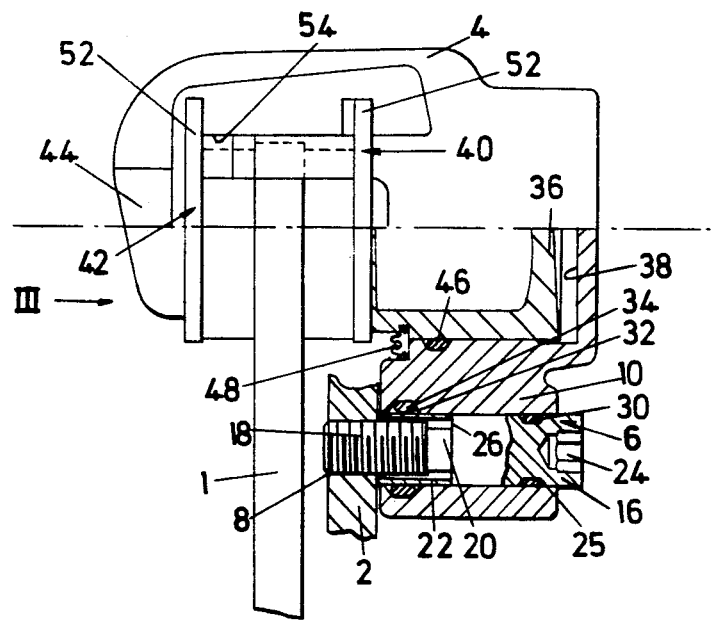
FIG. 1 is a part-sectional end view of a disc brake caliper assembly according to the invention.

The assembly includes a rotary disc 1, fixed to a wheel of the vehicle (not shown), and a non-rotary carrier 2 located at one side of the disc, and the caliper 4 mounted on a pair of pins 6 screwed into holes 8 in the carrier 2. The pins, one only being shown in FIG. 1, are spaced apart chordally of the disc 1, extend parallel to the rotary axis of the disc, and lie within the projected circumference of the disc; they are therefore on one side only of the disc. The non-rotary carrier 2, part only of which is shown in FIG. 1, may be part of a steering knuckle in the case of a front wheel brake.

The caliper 4 straddles a portion of the disc 1 and is mounted on the pins 6 for sliding movement in directions substantially parallel to the rotational axis of the disc 1.

Figure 3:
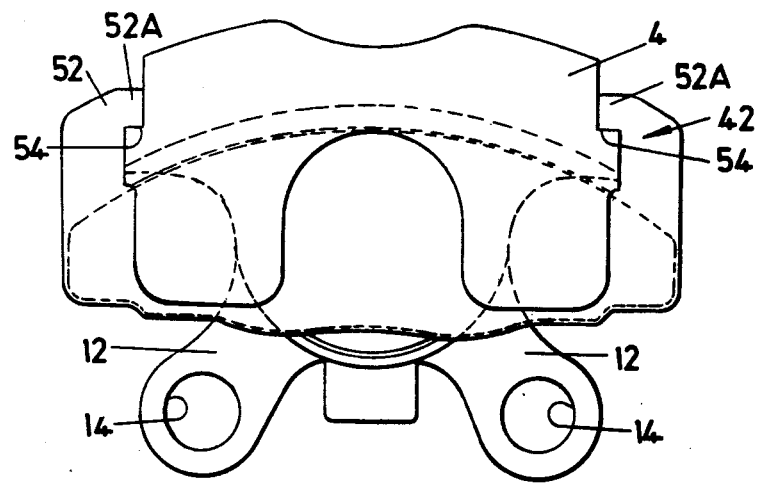
FIG. 3 is a side view with some parts omitted of the assembly of FIG. 1 taken in the direction of the arrow III.

The caliper 4 has a limb 10 from which extend two lugs 12. Each lug has a through aperture 14 in which one of the pins 6 is slidably received for mounting the caliper to the carrier 2. As seen in FIG. 3 the lugs are spaced so that they lie chordally of the brake disc 1 when the caliper is secured to the carrier 2.

The pins 6 are alike. Each pin has two shank portions 16, 18 separated by an intermediate portion 20. Portion 16 has a greater diameter than portion 18 and is a sliding fit in the through aperture 14 into which it is inserted for mounting the caliper to the carrier 2. The other portion 18 of the pin is threaded, and a sleeve 22 which is a sliding fit in the through aperture 14 is placed over a part of the portion 18 and is also slidable on the shank portion 18.

The caliper 4 is positioned to straddle the brake disc 1, the pins 6 are inserted into the through apertures 14 aligned with the holes 8 in the carrier 2, and the threaded shank portions 18 on the pins are then screwed into the holes 8 to mount the caliper to the carrier. Each pin has a hexagon socket 24 formed in the free or head end of the shank portion 16 to receive a key for screwing the pin into the hole 8. As each pin is screwed into the holes 8 so the end face 26 of the shank portion 16 at the junction with the intermediate portion 20 engages the sleeve 22 and pushes it against the carrier 2. The sleeves resist any further movement of the pins 6 into the holes 8 and cause the pins 6 to stretch at the waisted section 20 and serve as stops ensuring that the pins 6 are screwed into the carrier to the desired extent and so do not protrude so far from the carrier as to foul the brake disc 1. The elongation of the pins due to the stretching at the section 20 ensures that the pins remain tight throughout their service life.

Each pin 6 has, adjacent the head of shank portion 16, a circumferential groove 25 in which is fitted a resilient seal ring 30 to prevent dirt and moisture seeping in between the pin and the wall of the through aperture 14 and to provide positive retraction of the outboard brake pad after brake application.

The caliper limb 10 has a circumferential groove 32 formed in the wall of each through hole 14 at the inboard end of the aperture, that is the end nearer the carrier 2 when the caliper is mounted to the carrier. A resilient ring 34 is fitted in this groove and bears against the sleeve 22 when the pin is fitted in the aperture 14 so as to resiliently support the caliper on the pin. This ring acts like ring 30 to return the caliper 4 after braking as will be explained later.

A piston 36 is slidable in a cylinder 38 forming part of limb 10 of the caliper. The cylinder has an inlet (not shown) by which it may be connected to a hydraulic fluid circuit (not shown). A brake pad 40 is carried on the caliper adjacent the limb 10 and is acted upon by the piston 36. A like brake pad 42 is fixed on a limb 44 of the caliper and facing pad 40.

When fluid under pressure is supplied to the cylinder the brake pad 40 is applied directly to one face of the disc 1, sliding on the caliper body toward the disc. By reaction and the resultant sliding of the caliper 4 on the pins 6 the brake pad 42 is applied to the other side of the disc. The cylinder has a resilient seal ring 46 which also acts to provide a return spring-loading for the piston; and a dust "boot" 48.

The sliding movement of the caliper on the pins to apply the brake pad 42 to the disc 1 distorts the resilient rings 30, 34 which try to return to their undistorted state. Once brake application has ceased these rings can return to their undistorted state and in so doing move the caliper back along the pins to substantially its position before braking took place.

Figure 2:
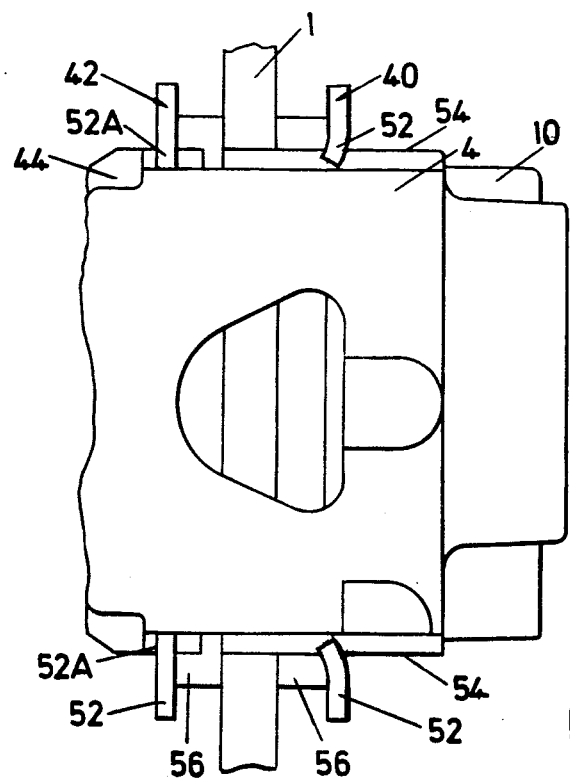
FIG. 2 is a top plan view of the assembly of FIG. 1.
Figure 4:
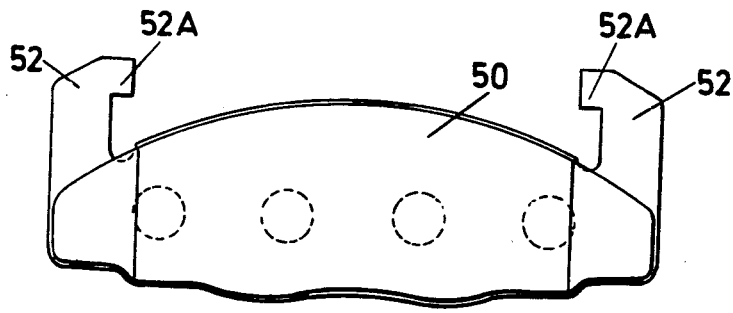
FIG. 4 is a side view of a brake pad for the assembly according to the invention.
Figure 5:
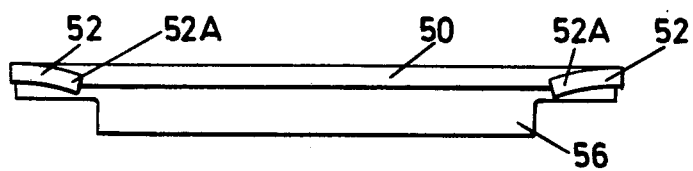
FIG. 5 is a top plan view of the pad of FIG. 4.

The brake pads 40, 42 are supported by the caliper on opposite faces of the disc 1. Each of the pads may have the same construction of backing plate 50 as shown in FIG. 4. This includes ends 52 having ears 52A which rest on guide surfaces in the form of two ledges 54 one at each side of the bridging section of caliper 4, as seen in FIG. 3. These ledges, as seen in FIG. 1, extend along the bridging section sides from one limb to the other of the caliper substantially parallel to the rotational axis of the disc 1. The backing plate ears 52A of backing plate 50 are bent so as seen in FIGS. 2 and 5 as to overlie the friction material 56 secured to the backing plate. These ears are long enough so that when those on the pad 42 are returned to a straight condition during assembly, they clinch tight to the limb 44 and so retain the pad tightly on the caliper. The other pad 40, acted on by the piston 36, is required to slide on the quide surfaces formed by the ledges 54 and so its ears 52A are not returned to the straight condition. Thus one pattern of brake pad can be used for either pad 40, 42 so simplifying manufacture and assembly.

Brake torque is transmitted by the ends 52 of the backing plates of the pads 40, 42 to the adjacent side surface of the caliper and is transmitted from the caliper directly to the pins 6 and so to the carrier 2.

What is claimed is:

1. In a disc brake caliper assembly comprising:
a caliper body having a spaced pair of limbs joined by a bridge section, guide surfaces including ledges at either side of the caliper bridge section between said limbs, and a pair of brake pads of one pattern, said pads being supported by said ledges, each of said brake pads including a backing plate and a lining segment;
each of said backing plates having ears arranged to rest on said ledges with the space between said ears, when said ears are within the side surface planes of their respective backing plates, being such that said ears would have an interference fit with and therefore clinch tightly to said caliper bridge section; the ears of one of said brake pads being bent out of the planes of its backing plate side surfaces to permit sliding movement of said one brake pad on said guide surfaces, the ears of the other of said brake pads clinching tightly to said caliper bridge section at one limb with the backing plate thereof in brake applying force engagement with said one limb, said arrangement permitting the use of one brake pad pattern for both brake pads.

2. A disc brake caliper assembly comprising a caliper body and a pair of brake pads, with one of said brake pads fixedly mouned on the caliper body of the caliper assembly and the other of said brake pads slidably mounted on the caliper body,
said brake pads being made to a common pattern and each including a backing plate and a lining segment;
each of said backing plates having ears engaging the caliper body, the ears of both of said backing plates being initally bent out of the planes of their respective backing plate side surfaces before installation on the caliper body so that the space between the bent-out ears of each backing plate is sufficiently greater than the width of the caliper body on which the brake pads are mounted to permit sliding movement of both brake pads, one of the brake pads having its ears straightened after installation to provide an interference fit with the caliper body to clinch on the caliper body and thereby fixedly mount the one brake pad on the caliper body.

3. A method of constructing a disc brake caliper assembly to provide a fixed brake pad and a slidable brake pad using brake pads of identical pattern, said method comprising the steps of:
a. providing a caliper body having a bridging section with side guide surfaces including ledges, and limbs at each end of the bridging section,
b. providing a pair of brake pads having inwardly extending spaced ears on the backing plates thereof with the ends of the ears bent out of the side surface planes of the backing plates to have a space therebetween slightly greater than the width of the caliper body bridging section between the guide surfaces thereof while permitting the ears to rest on the guide surface ledges,
c. positioning both brake pads with the ears on the ledges and sliding one brake pad to engage one caliper limb and the other brake pad toward the other caliper limb,
d. and straightening the ears of the one brake pad to clinch the ear ends against the caliper body bridging section guide surfaces and fixedly mount the one brake pad on the caliper body.

* * * * *